United States Patent [19]

Von Nortwick, II

[11] 4,424,710

[45] Jan. 10, 1984

[54] EYEGLASS NOSE PAD WEIGHT DISTRIBUTION MEASUREMENT

[76] Inventor: John E. Von Nortwick, II, 3055 Glen Oak Ave. North, Clearwater, Fla. 33519

[21] Appl. No.: 282,532

[22] Filed: Jul. 13, 1981

[51] Int. Cl.³ ............................................ G01M 19/00
[52] U.S. Cl. ............................................ 73/172; 73/9; 73/862.53; 73/862.54
[58] Field of Search ................ 73/172, 862.42, 862.55, 73/862.54, 862.53, 9, 862.62, 862.57; 33/200; 351/138

[56] References Cited

U.S. PATENT DOCUMENTS

| | | | |
|---|---|---|---|
| 42,801 | 5/1864 | Sleppy | 73/862.42 |
| 668,917 | 2/1901 | Haynes | 33/200 |
| 1,141,562 | 6/1915 | Law | 73/862.53 X |
| 1,822,352 | 9/1931 | Laursen | 73/862.42 |
| 1,950,882 | 3/1934 | Gianni | 73/862.62 |
| 2,157,723 | 5/1939 | Wilson | 73/862.42 |
| 2,795,953 | 6/1957 | Makowsky | 73/172 |
| 3,432,930 | 3/1969 | Ljungberg | 33/137 R |
| 3,438,252 | 4/1969 | Whitehurst | 73/862.62 |
| 3,555,895 | 1/1971 | Schmidt | 73/862.55 |
| 3,630,104 | 12/1971 | Milner | 33/137 R X |
| 3,828,438 | 8/1974 | Raymond, Jr. | 33/137 R |

FOREIGN PATENT DOCUMENTS 166436 7/1921 United Kingdom ............ 73/862.53

*Primary Examiner*—Jerry W. Myracle
*Assistant Examiner*—Tom Noland
*Attorney, Agent, or Firm*—Frijouf, Rust & Pyle

[57] ABSTRACT

A method is disclosed for using a tension gauge for comparing the tension required to move a frictional element relative to the nose of a wearer of a pair of eyeglasses when the frictional element is first disposed between and in frictional contact with a first nose pad of the eyeglasses and a first side of the wearer's nose to the tension required to subsequently move the frictional element relative the wearer's nose when the frictional element is disposed between and in frictional contact with a second nose pad of the eyeglasses and a second side of the wearer's nose. The gauge includes an elongated housing which defines a bore extending along the longitudinal length of the housing, a rod slidably cooperating with the bore and a first end of the rod disposed within the housing. A spring is disposed between the first end of the rod and the housing to bias the rod to a retractable position within the housing. A second end of the rod is disposed externally relative the housing and a clip extends from the second end of the rod. The clip grips the frictional elements such that the tension required to move the frictional element is indicated by the relative movement between the rod and the housing. The gauge is used particularly in determining whether the weight of a pair of eyeglasses exert on the wearer's nose by the nose pads of the eyeglasses is equally distributed on each side of the nose.

2 Claims, 5 Drawing Figures

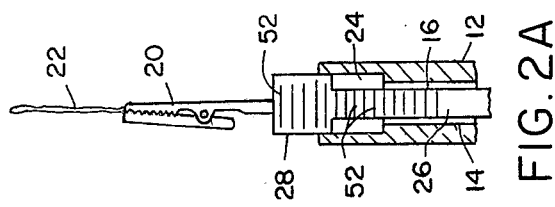
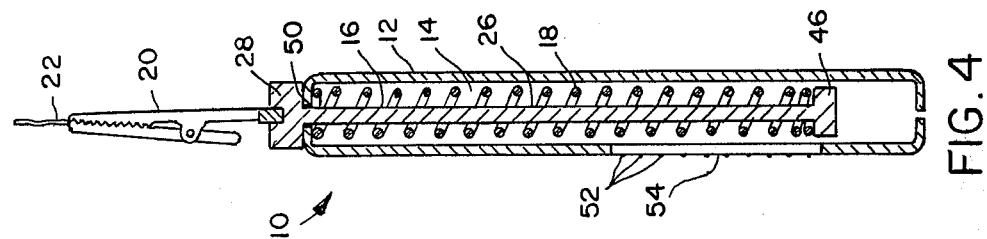
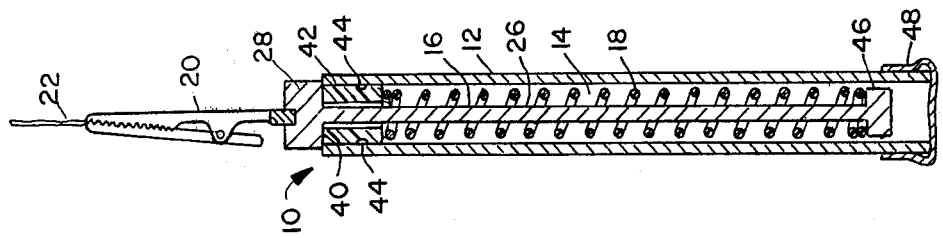
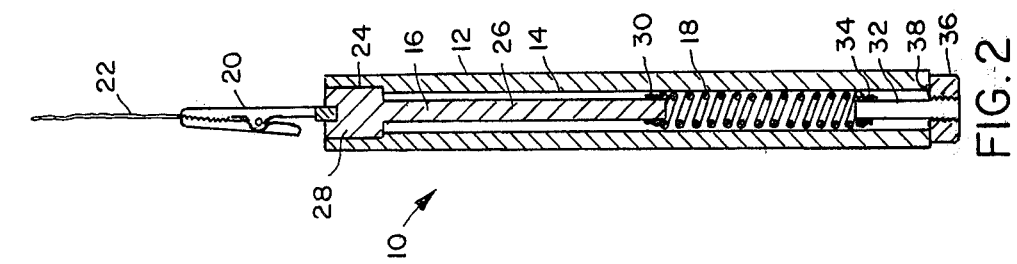
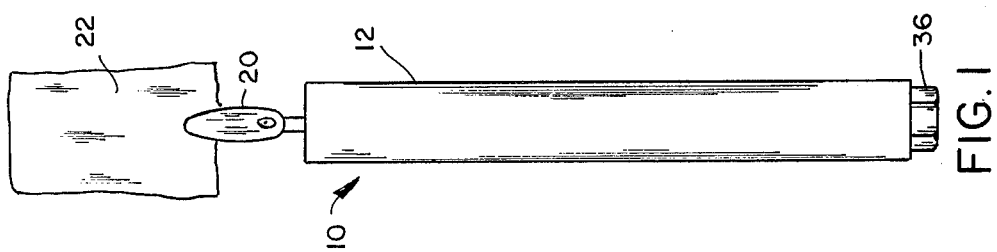

EYEGLASS NOSE PAD WEIGHT DISTRIBUTION MEASUREMENT

BACKGROUND OF THE INVENTION

1. Field of the Invention

This invention relates to a method for determining whether the weight of a pair of eyeglasses is equally distributed on each side of the wearer's nose.

2. Description of the Prior Art

Presently there exists many types of eyeglasses designed to support a pair of lenses an appreciable distance in front of a person's eyes. Typical eyeglasses include some type of a frame positioned about the lenses, a pair of temple members for connecting the frame to the ears of the wearer, and a pair of nose pads connected to the frame enabling the weight of the eyeglasses to be supported by the wearer's nose.

It should be recognized that the wearer's nose supports substantially all of the weight of the eyeglasses. It is usually the case that the wearer's nose becomes fatigued after the eyeglasses have been worn for an extended period of time. One obvious solution to make the eyeglasses more comfortable has been to reduce the overall weight of the eyeglasses by utilizing lightweight plastic lenses instead of glass lenses, and by manufacturing the frame from lightweight materials such as aluminum. Another solution has been to incorporate resilient pads onto the wear surface of the nose pads to cushion the weight of the eyeglasses on the wearer's nose. The only other solution to this problem has been to adjust the temple members and the nose pads of the frame of the eyeglasses in an attempt to equalize the distribution of the weight of the eyeglasses on each side of the wearer's nose. Because of the lack of any measuring devices to measure the distribution of the weight of the eyeglasses on the nose, the adjustment of the temple members and the nose pads is an art rather than a science. Accordingly, properly fitting the eyeglasses to the wearer is a subjective process, dependent primarily on the skill of the optician or optometrist. Moreover, the difficulty of equalizing the weight of the eyeglasses on the wearer's nose is aggravated due to the fact that one lens may be heavier than the other lens.

Therefore, it is an object of this invention to provide a method which overcomes the aforementioned inadequacies of the prior art devices and methods and provides an improvement which is a significant contribution to the advancement of the eyeglass art.

Another object of this invention is to provide a method for determining whether the weight of a pair of eyeglasses is equally distributed on each side of the wearer's nose.

Another object of this invention is to provide a method for indirectly determining the relative distribution of the weight of the eyeglasses on each side of the wearer's nose.

Another object of this invention is to provide an apparatus which enables an optician or optometrist to quickly and easily fit a pair of eyeglasses to a wearer such that the eyeglasses may be comfortably worn by the wearer.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims to cover the disclosed embodiments shown in the attached drawings and the equivalent thereof as set forth in the detailed discussion. For the purpose of summarizing the invention, the invention basically comprises a method for using a tension gauge for determining whether the weight of a pair of eyeglasses exerted on a wearer's nose by the nose pads of the eyeglasses is equally distributed on each side of the nose. More particularly, the tension gauge comprises an elongated member having a rod slidably disposed therein. A spring means, such as a tension spring or a compression spring, is provided for interconnecting the rod to the housing to urge the rod to a retracted position within the housing. Preferably, the spring exerts a force on the rod as the rod is pulled from within the housing to an extended position such that the restoring force exerted by the spring and the displacement of the rod vary linearly. A connecting means is connected to the portion of the rod which extends from the housing enabling a member or frictional element, such as a sheet of tissue paper, to be removably connected to the exposed end of the rod. Suitable indicia markings are provided to indicate to the optical technician or optometrist the distance in which the rod is pulled from within the housing to an extended position. Accordingly, with the spring means having a linear spring constant, the distance at which the rod is pulled from within the housing is linearly proportional to the amount of tension exerted to the member.

During use, the optical technician clips a clean sheet of tissue paper to the gauge by means of the alligator clip. The technician then lifts the pair of eyeglasses off of the wearer's nose and inserts the sheet of tissue paper between one of the nose pads and the eyeglasses and one side of the wearer's nose. The eyeglasses are then lowered to rest on the wearer's nose at which time the technician grasps the housing of the gauge and pulls until the sheet of tissue paper slides between the nose pad and the side of the wearer's nose. The amount of tension imparted to the tissue paper as the tissue paper slides between the nose pad and the side of the nose is then recorded. This same procedure is continued with respect to the other nose pad of the eyeglasses and the other side of the wearer's nose. If the amount of recorded tension imparted to the sheet of tissue paper are equal, then the weight of the eyeglasses is equally distributed on each side of the wearer's nose. Conversely, a variance in the amounts of recorded tensions is indicative of the weight of the eyeglasses being distributed more on one side of the nose than on the other side of the nose. Appropriate adjustments to the frame of the eyeglasses should then be accomplished and the method repeated until an equal distribution of weight is obtained.

It should be appreciated that the above method enables an optical technician or optometrist to equalize the weight of the eyeglasses on the wearer's nose irrespective of whether the weight of one of the lenses is greater than the other lens. Accordingly, the subjectiveness involved in properly fitting a patient or wearer with a pair of eyeglasses can be substantially eliminated.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a side elevational view of the gauge of the invention;

FIG. 2 is a cross-sectional view of FIG. 1 taken along the entire longitudinal length thereof;

FIG. 2a is a partial cross-sectional view of FIG. 1 showing the indicia markings disposed about the rod of the gauge;

FIG. 3 is a longitudinal cross-sectional view of another embodiment of the gauge of the invention having a compression spring installed therein;

FIG. 4 is a longitudinal cross-sectional view of a simplified embodiment of FIG. 3.

Similar reference characters refer to similar parts throughout the several views of the drawing.

DETAILED DESCRIPTION

As shown in FIGS. 1–4, the gauge 10 of the invention basically comprises an elongated housing 12 having a central aperture 14 disposed concentrically within the longitudinal length thereof. A rod 16 is slidably disposed within the aperture 14 of the housing 12. A spring means 18 interconnects the rod 16 and the housing 12 to urge rod 16 to a retracted position within the housing 12. A connecting means 20 is rigidly connected to the portion of the rod 16 protruding from the housing 12. The connecting means 20 enables a member 22 such as a sheet of flexible material to be connected to the exposed end of the rod 16.

More particularly, the first embodiment of the gauge 10 of the invention is illustrated in FIGS. 1, 2, and 2a and comprises a housing 12 having a substantially cylindrical configuration. The aperture 14 extends concentrically through the entire length of the cylindrical housing 12 from the upper to the lower end thereof. The upper portion of the aperture 14 includes a counterbore portion 24 which extends an appreciable distance within the housing 12. The rod 16 includes a minor shaft portion 26 and a major shaft portion 28. The major shaft portion 28 is dimensioned to slidably engage the counterbore 24 of the aperture 14 such that the major shaft portion 28 seats within the counterbore 24 when the rod 16 is in a retracted position inside the housing 12. The connecting means 20 such as an alligator clip is then rigidly connected to the major shaft portion 28.

As noted earlier, spring means 18 interconnects the rod 16 and the housing 12. In the first embodiment, spring means 18 comprises a tension spring 18 having one end connected to the lower end of the rod 16 and the other end connected relative to the housing 12. Preferably, the end of the tension spring 18 is connected to the end of the rod 16 by an adhesive 30 or the like. The other end of the tension spring 18 is preferably connected to a dowel 32 by means of a similar adhesive 34 or the like. The dowel 32 is then inserted within the lower portion of the aperture 14. A nut 36 or the like threadably engages the end of the dowel 32 and is connected to the lower end of the housing 12 by means of an adhesive 38. It should be understood that the diameter of the aperture 14 should be sufficiently large to enable the rod 16 together with the tension spring 18 to slidably engage therein without binding against the wall of the aperture 14.

FIG. 3 illustrates the second embodiment of the gauge 10 of the invention wherein a compression spring is utilized rather than a tension spring. Specifically, housing 12 comprises an elongated cylindrical shaped tube with both ends open-ended. A boss 40 having a central aperture 42 disposed axially therethrough is rigidly connected within the upper end of the housing 12 by crimping 44, or by an adhesive. The aperture 42 in the boss 40 is dimensioned to enable the minor shaft portion 26 of the rod 16 to slidably engage therethrough. Another boss or a protuberance 46 is rigidly connected to the other end of the rod 16. A compression spring 18 is positioned concentrically about the minor shaft portion 26 of the rod 16 between the boss 40 and the protuberance 46 such that the compression spring 18 urges the rod 16 to a retracted position within the housing 12. The major shaft portion 28 of the rod 16 seats against the outer surface of the boss 40 when the rod 16 is in a fully retracted position within the housing 12. A dust cap 48 may be positioned about the lower end of the housing 12 to prevent contamination such as dust from entering the housing 12.

FIG. 4 illustrates a simplified embodiment of the gauge 10 of the invention shown in FIG. 3. Specifically, the simplified embodiment of the gauge 10 comprises an elongated cylindrical housing 12 manufactured from relatively thin tubular material such as polyvinyl chloride. The upper end of the housing 12 is curled inwardly to define an opening 50. The opening 50 includes a diameter sufficiently large to enable the rod 16 to slidably engage therethrough and sufficiently small to retain the compression spring 18 with the housing 12 such that the compression spring 18 is secured between the inwardly curved edges of the housing 12 and the protuberance 46 of the other end of the rod 16. The rod 16 is therefore urged to a retracted position within the housing 12. The other end of the housing 12 may be similarly curved inwardly to seal off the end of the housing 12 thereby eliminating the need for the dust cap 48 mentioned previously.

In each of the illustrated embodiments, the spring constant of the tension and the compression springs 18 is preferably linear such that the spring exerts a linearly graduated force on the rod 16 as the rod 16 is pulled from within the housing 12. The rod 16 may be marked with suitable indicia to indicate the distance in which the rod 16 is pulled from its retracted position within the housing 12 and correspondingly the relative amount of tension imparted to the member 22. For example, in the first embodiment of the gauge 10 as shown in FIG. 2a, a series of equally spaced indicia markings 52 are positioned concentrically about the minor and the major shaft portions 26 and 28 of the rod 16. Thus, the distance in which the rod 16 is pulled from within the housing 12 can be easily determined. In the second embodiment of the gauge 10 as shown in FIG. 3, the indicia markings 52 are disposed concentrically about only the minor shaft portion 26 of the rod 16. Thus, as the rod 16 is pulled from within the housing 12, the indicia markings 52 may be viewed with respect to the outer surface of the boss 40. It should be noted that many other suitable indicia markings may be utilized without departing from the spirit and scope of this invention. For example, as shown in the simplified embodiment of gauge 10 of FIG. 4, the housing 12 may comprise a slot 54 disposed longitudinally along a substantial portion of its length and a series of indicia markings 52 positioned along the slot 54. The relative position of the protuberance 46 of the rod 16 may therefore be viewed via the slot 54 to indicate the distance in which the rod 16 is pulled from within the housing 12.

The connecting means 20 preferably comprises an alligator clip whose end is integrally molded within the major shaft portion 28. The alligator clip provides a means for quickly and easily connecting the flexible member 22 to the exposed end of the rod 16. Preferably, member 22 comprises a sheet of flexible material such as a tear resistant tissue paper.

The method contemplated by this invention utilizes the gauge 10 of the invention to determine whether the weight of a pair of eyeglasses exerted on a wearer's nose by the nose pads of the eyeglasses is equally distributed on each side of the nose. The method comprises the following steps. First, the eyeglass technician or optometrist clips a clean sheet of tear resistant tissue paper 22 to the gauge 10 by means of the alligator clip 20. The technician then lifts the pair of eyeglasses off of the wearer's nose enabling the sheet of tissue paper to be inserted between one of the nose pads of the eyeglasses and one side of the wearer's nose. The eyeglasses are then lowered to a seating position on the wearer's nose. The technician then grasps the housing 12 of the gauge 10 and pulls until the sheet of tissue paper 22 begins to slide between the nose pad and the side of the nose. The amount of force or tension required to initiate movement of the tissue paper 22 between the nose pad and the nose is a function of (1) the coefficients of static friction between the nose pad and the sheet of tissue paper 22 and between the sheet of tissue paper 22 and the side of the nose, and (2) the weight of the eyeglasses exerted normally on the side of the nose. Since the coefficients of static friction remain constant, the amount of tension force required to initiate the movement of the tissue paper 22 between the nose pad and the side of the nose is proportional to the weight of the eyeglasses on the side of the nose. Thus, the technician merely records the amount of tension required to initiate slippage via the indicia markings 52 of the gauge 10. The above steps are then repeated with respect to the other nose pad of the eyeglasses and the other side of the nose. The recorded amounts of tensions required to initiate slippage on each side of the nose are then compared, with equal amounts of tension being indicative of equal distribution of the weight of the eyeglasses on both sides of the nose. Likewise, a variance in the amounts of recorded tension is indicative of the weight of the eyeglasses being unequally distributed on both sides of the nose. Appropriate adjustments to the frame of the eyeglasses should then be reaccomplished and the above steps repeated until an equal distribution of the weight is obtained.

It should be understood that although the above method was described in relation to the amount of tension required to initiate slippage of the tissue paper 22 between the nose pad and the side of the nose, the above method is equally applicable to the amount of force necessary to maintain slippage once the slippage has been initiated. In other words, immediately when the tissue paper 22 begins to slip, the coefficients of static friction become irrelevant and the coefficients of kinetic friction each become a factor in the amount of tension required to maintain slippage between the sheet of tissue paper and the nose pad of the eyeglasses and the side of the wearer's nose. Thus, the amount of force or tension required to maintain slippage is a function (1) of the coefficients of kinetic friction between the sheet of tissue paper 22 and the side of the wearer's nose and between the sheet of tissue paper 22 and the nose pad of the glasses and (2) the weight of the eyeglasses exerted normally on the side of the wearer's nose. The recording of such tension during slippage can therefore be used to determine the proportional weight of the eyeglasses on each side of the nose, with equal amounts of recorded tensions being indicative of equal distribution of weight on both sides of the wearer's nose.

The present disclosure includes that contained in the appended claims as well as that of the foregoing description. Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and scope of the invention.

Now that the invention has been described, I claim:

1. A method for determining whether the weight of a pair of eyeglasses exerted on the nose of the wearer by the first and the second nose pads of the eyeglasses is equally distributed on the first and the second sides of the nose, comprising the steps of:
   (1) inserting a frictional element between the first nose pad and the first side of the nose of the wearer;
   (2) pulling said frictional element with a force measuring device until said frictional element begins to slide between the first nose pad and the first side of the nose of the wearer;
   (3) reading from indicia associated with said force measuring device the relative amount of tension imparted to said frictional element when said frictional element begins to slide between the first nose pad and the first side of the nose of the wearer and noting said reading;
   (4) repeating steps (1) to (3) with respect to the second nose pad and the second side of the nose of the wearer; and
   (5) comparing the amounts of the two noted tensions, with equal amounts being indicative of equal distribution of the weight of the eyeglasses on the nose of the wearer.

2. A method for determining whether the weight of a pair of eyeglasses exerted on the nose of the wearer by the first and the second nose pads of the eyeglasses is equally distributed on the first and the second sides of the nose, comprising the steps of:

(1) inserting a frictional element between the first nose pad and the first side of the nose of the wearer;

(2) pulling said frictional element with a force measuring device until said frictional element begins to slide between the first nose pad and the first side of the nose of the wearer;

(3) reading from indicia associated with said force measuring device the relative amount of tension imparted to said frictional element as said frictional element slides between the first nose pad and the first side of the nose of the wearer and noting said reading;

(4) repeating steps (1) to (3) with respect to the second nose pad and the second side of the nose of the wearer; and (5) comparing the amounts of the two noted tensions, with equal amounts being indicative of equal distribution of the weight of the eyeglasses on the nose of the wearer.

* * * * *

UNITED STATES PATENT AND TRADEMARK OFFICE
CERTIFICATE OF CORRECTION

PATENT NO. : 4,424,710
DATED : January 10, 1984
INVENTOR(S) : John E. Van Nortwick, II It is certified that error appears in the above–identified patent and that said Letters Patent are hereby corrected as shown below:

First page, item [76], the inventor's surname "Von Nortwick" should read --Van Nortwick--.

Column 2, line 55, "tension" should read --tensions--.

Signed and Sealed this

Seventh Day of August 1984

[SEAL]

Attest:

GERALD J. MOSSINGHOFF

Attesting Officer     Commissioner of Patents and Trademarks